United States Patent
Marumoto et al.

(10) Patent No.: US 8,173,256 B2
(45) Date of Patent: May 8, 2012

(54) AROMATIC POLYAMIDE FIBER, A METHOD FOR PRODUCING THE SAME, AND PROTECTIVE CLOTHING MATERIAL COMPRISING THE SAME

(75) Inventors: Yasuhiro Marumoto, Iwakuni (JP); Shigeru Ishihara, Matsuyama (JP)

(73) Assignee: Teijin Techno Products Limited, Osaka (JP)

( * ) Notice: Subject to any disclaimer, the term of this patent is extended or adjusted under 35 U.S.C. 154(b) by 600 days.

(21) Appl. No.: 12/307,863

(22) PCT Filed: Jul. 26, 2006

(86) PCT No.: PCT/JP2006/315249
§ 371 (c)(1),
(2), (4) Date: Jan. 7, 2009

(87) PCT Pub. No.: WO2008/012925
PCT Pub. Date: Jan. 31, 2008

(65) Prior Publication Data
US 2009/0239052 A1    Sep. 24, 2009

(51) Int. Cl.
*B32B 27/34* (2006.01)

(52) U.S. Cl. ......... 428/395; 428/364; 264/180; 264/184

(58) Field of Classification Search .............. 428/364, 428/395; 264/180, 184
See application file for complete search history.

(56) References Cited

U.S. PATENT DOCUMENTS

| | | | |
|---|---|---|---|
| 4,018,735 A | 4/1977 | Nakagawa et al. | |
| 4,758,649 A | 7/1988 | Asano et al. | |
| 5,340,624 A * | 8/1994 | Sublett | 428/35.8 |
| 5,571,891 A | 11/1996 | Jung et al. | |
| 5,646,234 A | 7/1997 | Jung et al. | |
| 5,738,940 A | 4/1998 | Neuert | |
| 6,290,888 B1 | 9/2001 | Kawai | |
| 7,935,401 B2 * | 5/2011 | Opuszko et al. | 428/34.9 |
| 7,939,147 B2 * | 5/2011 | Dawes et al. | 428/34.9 |
| 2003/0021918 A1 * | 1/2003 | McKillip | 428/34.1 |
| 2008/0003462 A1 * | 1/2008 | Aleyraz et al. | 429/13 |
| 2009/0038736 A1 * | 2/2009 | Lorence et al. | 156/86 |

FOREIGN PATENT DOCUMENTS

| | | |
|---|---|---|
| CN | 1473969 A | 2/2004 |
| DE | 4411757 A1 | 10/1995 |
| EP | 0695776 A2 | 2/1996 |
| GB | 1381181 A | 1/1975 |
| GB | 1384985 A | 2/1975 |
| JP | 52-154881 A | 12/1977 |
| JP | 07-278303 A | 10/1995 |
| JP | 07-300534 A | 11/1995 |
| JP | 2001-303365 A | 10/2001 |
| JP | 2004-3049 A | 1/2004 |
| JP | 4563827 B2 | 8/2010 |
| SU | 1715209 A3 | 2/1992 |

* cited by examiner

*Primary Examiner* — N. Edwards
(74) *Attorney, Agent, or Firm* — Sughrue Mion, PLLC

(57) ABSTRACT

An aromatic polyamide fiber comprising an aromatic polyamide containing a structural repeating unit of the following formula (1), and a structural repeating unit of the following repeating unit (2) in an amount of 30 mol % or more to the whole amount of the aromatic polyamide structural units, the fiber having strength of 20 cN/dtex or more and modulus of elongation of 500 cN/dtex or more:

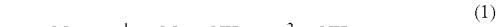

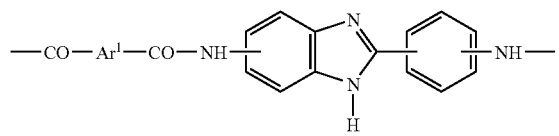

wherein $Ar^1$ and $Ar^2$ each independently represent an unsubstituted or substituted divalent aromatic group.

7 Claims, No Drawings

AROMATIC POLYAMIDE FIBER, A METHOD FOR PRODUCING THE SAME, AND PROTECTIVE CLOTHING MATERIAL COMPRISING THE SAME

TECHNICAL FIELD

The present invention relates to an aromatic polyamide fiber having small fineness of a single filament and excellent mechanical properties such as tensile strength and initial modulus, a method for producing the aromatic polyamide fiber, and a protective clothing material having lightweight and excellent bulletproof performance, comprising the aromatic polyamide fiber.

BACKGROUND ART

Conventionally, an aromatic polyamide (aramid) fiber comprising aromatic dicarboxylic acid components and aromatic diamine components, particularly p-aramid fiber, is widely used in industrial applications and clothing material applications by taking advantage of characteristics such as its strength, high modulus and high heat resistance.

For example, a protective clothing material using a multi-layered of aramid fiber cloths is one of the specific applications, and various methods are hitherto proposed in, for example, JP-A-52-46700 and JP-A-57-207799.

A poly(p-phenylene terephthalamide) (PPTA) fiber is the representative p-aramid fiber used in the above applications. This fiber has many advantages, but has the disadvantage on process in the point that the fiber is produced by a so-called crystal liquid spinning method utilizing optical anisotropy of a polymer dope. Furthermore, regarding fiber performances, the fiber has the disadvantages such that among mechanical properties, strength is not always high, elongation is low and toughness is deficient.

Particularly, interest regarding protection against bullet is recently increased, and the requirement in a protective clothing material to firearms firing a bullet having energy of higher level is increasing. To meet this requirement, PPTA fiber is required to increase the number of layers in order to increase bulletproof performance, and this significantly increases the weight. As a result, it is difficult to regularly use the PPTA fiber as a protective clothing material.

To eliminate such problems, an attempt has been made to develop an aromatic polyamide that has high solubility in the conventional amide solvent and can easily be spun, and that a fiber obtained therefrom has high tensile strength and high initial modulus after drawing treatment.

For example, JP-A-7-300534 proposes production of an aromatic polyamide fiber which forms an isotropic solution to an amide solvent by polycondensing dicarbonyl dihalides and at least two kinds of diamines.

However, the aromatic polyamide fiber disclosed in the above patent publication is deficient in mechanical properties such as tensile strength and initial modulus, and it is the actual condition that an aramid fiber that can develop excellent mechanical properties is not yet obtained.

DISCLOSURE OF THE INVENTION

Objects of the present invention are to solve the above problems in the prior art and to provide an aromatic polyamide fiber having small fineness of a single filament and excellent mechanical properties such as tensile strength and initial modulus, and capable of exhibiting sufficient bulletproof performance when used as, for example, a protective clothing material to a bullet, a method for producing the same, and a protective clothing material comprising the same.

As a result of making repeated studies to solve the above problems, the present inventors have reached to complete the present invention.

That is, the objects of the present invention are achieved by an aromatic polyamide fiber comprising an aromatic polyamide containing a structural repeating unit of the following formula (1), and a structural repeating unit of the following repeating unit (2) in an amount of 30 mol % or more to the whole amount of the aromatic polyamide structural units, the fiber having strength of 20 cN/dtex or more and modulus of elongation of 500 cN/dtex or more; a protective clothing material comprising a layered product of a single kind or plural kinds of fiber cloths, wherein the fiber cloth is comprised of the aromatic polyamide fiber; and a method for producing an aromatic polyamide fiber, comprising extruding an aromatic polyamide solution containing a structural repeating unit of the following formula (1), and a structural repeating unit of the following repeating unit (2) in an amount of 30 mol % or more to the whole amount of the aromatic polyamide structural units from a spinning nozzle, coagulating the solution in an NMP aqueous solution having a concentration of from 10 to 50% by weight at a temperature of from 20 to 50° C., drawing the resulting fiber by 1.3 to 2.5 times in an NMP aqueous solution having a concentration of from 30 to 80% by weight at a temperature of from 20 to 50° C., and then heat-treating the resulting fiber.

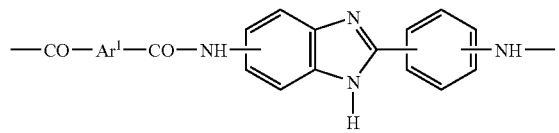

wherein $Ar^1$ and $Ar^2$ each independently represent an unsubstituted or substituted divalent aromatic group.

BEST MODE FOR CARRYING OUT THE INVENTION

The embodiment of the present invention is described in detail below.

The aromatic polyamide intended in the present invention is a polymer having one kind or two or more kinds of divalent aromatic groups directly connected through an amide bond. The aromatic group may be a group having two aromatic rings bonded by oxygen, sulfur or an alkylene group. Those divalent aromatic groups may contain a lower alkyl group such as methyl group or ethyl group, a methoxy group, a halogen group such as chloro group, and the like.

The aromatic polyamide of the present invention is that an aromatic dicarboxylic acid chloride and an aromatic diamine are reacted in an amide polar solvent according to the conventionally known method to obtain a polymer solution.

The aromatic dicarboxylic acid dichloride in the present invention may be the conventionally known compounds. Examples thereof include terephthalic acid dichloride, 2-chloroterephthalic acid dichloride, 3-methylterephthalic acid dichloride, 4,4'-biphenyldicarboxylic dichloride, 2,6-naphthalenedicarboxylic acid dichloride and isophthalic acid dichloride.

The present invention uses two kinds of aromatic diamines. One aromatic diamine is one kind selected from substituted or unsubstituted p-aromatic diamines, and may be the generally known diamines such as p-phenylene diamine or p-biphenylene diamine. Another aromatic diamine is one kind selected from substituted or unsubstituted diamines having a phenylbenzimidazole group. Of those, 5(6)-amino-2-(4-aminophenyl)benzimidazole is preferred from the points of easy availability, excellent tensile strength and initial modulus possessed by a fiber obtained, and the like.

Examples of the amide polar solvent used in the present invention include N,N-dimethylformamide, N,N-dimenthylacetamide, N-methyl-2-pyrrolidone and dimethylimidazolidinone. In particular, N-methyl-2-pyrrolidone is preferred from the points of handling properties and stability during from polymerization of an aromatic polyamide to dope preparation and wet spinning step, toxicity of a harmful solvent, and the like.

The aromatic copolyamide fiber produced by the present invention is required to contain structural repeating units of the following formula (1) and the following formula (2) and is required that the structural repeating unit of the formula (2) is contained in an amount of 30 mol % or more to the whole amount of the structural units. The preferred content of the structural repeating unit is in a range of 50 mol % or more. Where the content is less than 30 mol %, the problem arises that a reaction solution becomes turbid in a polymerization reaction, and such a turbid dope makes it difficult to conduct spinning.

(1)

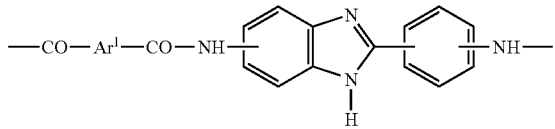
(2)

wherein $Ar^1$ and $Ar^2$ each independently represent an unsubstituted or substituted divalent aromatic group.

In the present invention, to increase solubility of the aromatic copolyamide in an amide polar solvent, the generally known inorganic salts are added in an appropriate amount before, during or after the polymerization. Examples of the salt include lithium chloride and calcium chloride. The amount of the salts added is preferably from 3 to 10% by weight. Where the addition amount exceeds 10% by weight, it is difficult to dissolve the whole amount of the salts in the amide polar solvent, which is not preferred. On the other hand, where the addition amount is less than 3% by weight, an effect of improving solubility is deficient, which is not preferred.

After completion of the reaction, according to need, a basic inorganic compound such as sodium hydroxide, potassium hydroxide, calcium hydroxide or calcium oxide is added to conduct neutralization reaction.

The concentration of a polymer formed in the polymerization reaction to a solvent is important. To obtain a homogeneous polymer having high degree of polymerization, 10% by weight or less is preferred as a concentration of a polymer formed. Particularly, a range of from 3 to 8% is advantageous to obtain a stable polymer.

In the present invention, the aromatic copolyamide dope is extruded in a coagulating liquid to obtain a coagulated yarn. The coagulating liquid in the present invention is comprised of an aqueous solution comprising two components of an amide solvent and water. The amide solvent is preferably N-methyl-2-pyrrolidone from the points of handling properties, stability, toxicity of a harmful solvent, and the like.

The concentration of the amide solvent in the aqueous solution is necessary to be from 10 to 50% by weight. Where the concentration exceeds 50%, coagulation of the aromatic copolyamide dope does not proceed, fusion between yarn-like materials is generated, and it is difficult to continuously conduct yarn-making. Furthermore, where the concentration is less than 10%, plasticization does not proceed sufficiently, and drawing properties at the time of the drawing subsequently conducted deteriorate, which is not preferred.

The temperature of a coagulation bath has a close relationship to the composition of a coagulation bath. However, where the temperature is too high, fusion between yarns is vigorous, and workability deteriorates. For this reason, the temperature is required to be from 20 to 50° C.

In the present invention, an aromatic copolyamide yarn is taken off from the coagulation bath, sent in an aqueous solution comprising two components of an amide solvent and water, and drawn to from 1.3 to 2.5 times in the aqueous solution. The concentration of the amide solvent in the NMP aqueous solution is required to be from 30 to 80%. Where the concentration exceeds 80%, the aromatic copolyamide yarn dissolves in the NMP solution, and therefore, it is difficult to continuously conduct fiber-making. Furthermore, where the concentration is less than 30%, plasticization does not proceed sufficiently, and it is difficult to ensure the above draw ratio. Where the temperature of the NMP aqueous solution is too high, fusion between yarns is vigorous, and workability deteriorates. Therefore, the temperature is required to be form 20 to 50° C.

Subsequently, the aromatic copolyamide yarns are treated in a water washing step to sufficiently remove a solvent, sufficiently dried in a drying step, and then heat-treated.

It is preferred in the present invention that the heat treatment temperature of the yarns is in a range of from 300 to 550° C. Where the temperature is lower than 300° C., the fiber does not sufficiently induce crystallization. As a result, sufficient tensile strength and initial modulus may not be obtained. Where the temperature exceeds 550° C., the fiber induces thermal degradation. As a result, sufficient tensile strength and initial modulus may not be obtained.

The aromatic copolyamide fiber thus obtained is required to have tensile strength of 20 cN/dtex or more and initial modulus of 500 cN/dtex or more.

The fineness of the fiber in the case of using the fiber in a protective clothing material is preferably in a range of from 200 to 1,700 dtex. Where the fineness is less than 200 dtex, it is difficult to obtain the required weight per unit, which is not preferred. The fineness of a single filament is preferably from 0.5 to 6 dtex. Where the fineness is less than 0.5 dtex, fluff is generated due to broken single filament in the case of weaving, and weaving work is difficult. On the other hand, where the fineness of a single filament exceeds 6 dtex, separation is liable to be generated between single filaments.

The form of a cloth in using the above fiber to a protective clothing material can employ optional forms such as a knitted fabric, a woven fabric or a nonwoven fabric. When the form is a woven fabric, the respective fibers are arranged in one warp direction and one weft direction. As a result, the performance of the fiber is liable to be exhibited, and high bulletproof performance which is the object of the present invention is liable to be achieved. Furthermore, the form of weaving structure is liable to be maintained, and the texture is difficult to open. Therefore, the fibers do not shift by landing a bullet thereon, and loss of fiber performance is small, thus showing high bulletproof performance. This is preferred.

The above aromatic copolyamide fiber cloths are layered and used as a layered product. The layered product may be used alone or may be used in combination with other high-strength fiber cloth. In this case, it is preferred to use a cloth of fibers having tensile strength of 18 cN/dtex or more such as other aramid fibers, polyacrylate fibers or high-strength polyethylene fibers as the high-strength fiber cloth to be combined.

EXAMPLES

Constitution and effect of the present invention are described in more detail below by reference to the Examples. Each of properties in the Examples is obtained by the following method.
(1) Viscosity (ηinh) The viscosity was measured in a concentrated sulfuric acid having a concentration of 98% at 30° C. with regard to a solution having a polymer concentration of 0.5 g/dl.
(2) Ballistic Resistance Test
Performance test of Section IIIA by 9 mm FMJ bullet (bullet speed: 424±15 m/s) according to NIJ-STD (National Institute of Justice-Standard)-0108.02 and performance test of 22 caliber 17-grain by a dummy bullet according to MIL-STD (Military Standard)-662 were carried out.

Example 1

1.940 liters of N-methyl-2-pyrrolidone (NMP) was introduced into a stirring tank equipped with a stirring blade, the inside of which nitrogen flows, and 60.0 g of sufficiently dried calcium chloride was introduced and dissolved therein. 11.0 g (30 mol%) of p-phenylenediamine (PPD) and 53.0 g (70 mol %) of 5(6)-amino-2-(4-aminophenyl)benzimidazole (DAPBI) were weighed and introduced to dissolve. Subsequently, 68.6 g (100 mol %) of terephthalic acid chloride (TPC) was introduced to react, thereby obtaining a polymer solution. 110.0 g of an NMP dispersion containing 22.5% by weight of calcium hydroxide was added to this product to conduct neutralization reaction.

Viscosity (ηinh) measured with regard to a polymer precipitated from the polymer solution obtained was 6.0.

The dope obtained was extruded from spinning nozzles having a hole diameter of 0.15 mm and the number of holes of 25 in a proportion of 3.5 cc per minute, and spun in an aqueous solution having an NMP concentration of 30% by weight at 50° C. through a space called air gap, thereby obtaining a coagulated yarn. Drawing was then conducted at a draw ratio of 2.0 times in an NMP aqueous solution having a concentration of 70% at a temperature of 30° C. After drawing, the yarn was washed with water, dried and then heat-treated at a temperature of 450° C. The yarn was rolled up at a speed of 30.0 m/min to obtain a yard having 42 dtex/25 fil.

Mechanical properties of this fiber were that tensile strength is 24.9 cN/dtex and initial modulus is 900 cN/dtex.

Examples 2 to 6 and Comparative Examples 1 to 2

According to the above production method, aromatic polyamide fibers were obtained in the same manner as in Example 1, except that the addition proportion of diamines, the draw ratio in NMP aqueous solution, and the heat-treatment temperature of aromatic polyamide fiber were changed to those as shown in Table 1. The results are shown in Table 1.

Example 7

Twenty-five aromatic polyamide fiber yarns obtained in Example 6 were arranged and twisted in a twist coefficient of 6, and woven in warp and weft weave densities of 45/in to prepare a plain weave fabric having a weight per unit of 210 g/m². Twenty-four woven fabrics were piled, and were subjected to a bulletproof test. As a result, V50 was 530 m/s.

Comparative Example 3

A plain weave fabric was prepared from PPTA fibers according to MIL (Military Standard)-C-44050. An aramid (PPTA) fiber of 500 filaments, having tensile strength of 20 cN/dtex, modulus of elongation of 500 cN/dtex, and 1,100 dtex was twisted in 59 T/m (twist coefficient: 7.6), and woven in warp and weft weave densities of 30/in, thereby obtaining a plain weave fabric having a weight per unit of 285 g/m². Eighteen woven fabrics were piled and subjected to a bulletproof test in the same manner as in the above Example. As a result, V50 was 494 m/s.

TABLE 1

|  | Example 1 | Example 2 | Example 3 | Comparative Example 1 | Example 4 | Example 5 | Example 6 | Comparative Example 2 |
|---|---|---|---|---|---|---|---|---|
| TPC (mol %) | 100 | 100 | 100 | 100 | 100 | 100 | 100 | 100 |
| PPD (mol %) | 30 | 30 | 30 | 30 | 30 | 30 | 50 | 80 |
| DAPBI (mol %) | 70 | 70 | 70 | 70 | 70 | 70 | 50 | 20 |
| Plasticized draw ratio (Times) | 1.9 | 2.3 | 1.5 | 1.1 | 1.9 | 1.9 | 1.9 | Yarn-making impossible |
| Fineness of single filament (dtex) | 1.7 | 1.4 | 2.2 | 3.0 | 1.7 | 1.7 | 1.7 |  |
| Heat-treatment temperature (° C.) | 450 | 450 | 450 | 450 | 250 | 580 | 450 |  |
| Tensile strength (cN/dtex) | 24.9 | 26.9 | 21.5 | 15.6 | 13.4 | 18.0 | 24.9 |  |
| Initial modulus (cN/dtex) | 900 | 870 | 840 | 760 | 570 | 840 | 900 |  |
| Elongation at break (%) | 2.9 | 3.1 | 2.7 | 2.2 | 2.4 | 2.4 | 2.9 |  |

INDUSTRIAL APPLICABILITY

According to the present invention, an aromatic polyamide fiber having small fineness of a single filament and excellent mechanical properties such as tensile strength and initial modulus as compared with the conventional aromatic polyamide fiber is obtained. Therefore, a protective clothing material having lightweight and excellent bulletproof performance can be provided in, for example, the field of protective clothing materials. Furthermore, according to the production method of the present invention, the aromatic polyamide fiber can be produced stably and inexpensively.

The invention claimed is:

1. An aromatic polyamide fiber comprising an aromatic polyamide consisting of a structural repeating unit of the following formula (1), and a structural repeating unit of the following repeating unit (2) in an amount of 30 mol % or more to the whole amount of the aromatic polyamide structural units, the fiber having strength of 20 to 26.9 cN/dtex and modulus of elongation of 500 to 900 cN/dtex:

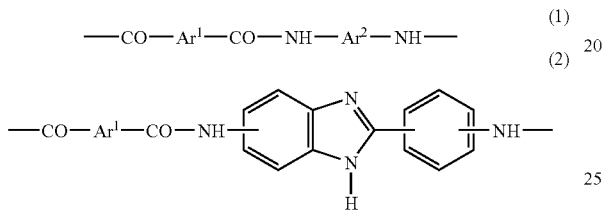

wherein $Ar^1$ represents an unsubstituted or substituted divalent aromatic group, and $Ar^2$ represents an unsubstituted phenylene group;
wherein the fiber comprises filaments having a fineness of 0.5 to 2.2 dtex.

2. A protective clothing material comprising a layered product of a single kind or plural kinds of fiber cloths, wherein the fiber cloth is comprised of the aromatic polyamide fiber as claimed in claim 1.

3. A method for producing an aromatic polyamide fiber, comprising extruding an aromatic polyamide solution containing a structural repeating unit of the following formula (1), and a structural repeating unit of the following repeating unit (2) in an amount of 30 mol % or more to the whole amount of the aromatic polyamide structural units from a spinning nozzle, coagulating the solution in an NMP aqueous solution having a concentration of from 10 to 50% by weight at a temperature of from 20 to 50° C., drawing the resulting fiber by 1.3 to 2.5 times in an NMP aqueous solution having a concentration of from 30 to 80% by weight at a temperature of from 20 to 50° C., and then heat-treating the resulting fiber:

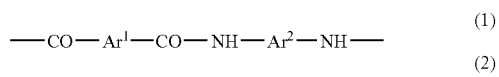
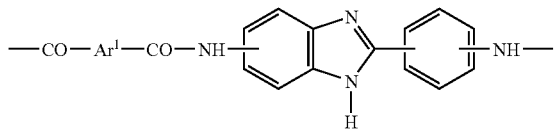

wherein $Ar^1$ and $Ar^2$ each independently represent an unsubstituted or substituted divalent aromatic group,
wherein said method produces an aromatic polyamide fiber as claimed in claim 1.

4. The method for producing an aromatic polyamide fiber as claimed in claim 3, wherein the heat treatment temperature is from 300 to 550° C.

5. The method for producing an aromatic polyamide fiber as claimed in claim 3 or 4, wherein tensile strength of the aromatic polyamide fiber is 21.5 to 26.9 cN/dtex, and initial modulus thereof is 570 to 900 cN/dtex.

6. The aromatic polyamide fiber as claimed in claim 1, wherein the fiber comprises filaments having a fineness of 0.5 to 1.7 dtex.

7. The aromatic polyamide fiber as claimed in claim 1, wherein the fiber comprises filaments having a fineness of 0.5 to 1.4 dtex.

* * * * *